United States Patent

Mayer et al.

Patent Number: 5,563,205
Date of Patent: Oct. 8, 1996

[54] WATER RESISTANT, REMOVABLE ACRYLIC EMULSION PRESSURE SENSITIVE ADHESIVE

[75] Inventors: Andre Mayer, Kreuzlingen; Paul Keller, Gottlieben, both of Switzerland

[73] Assignee: Avery Dennison Corporation, Pasadena, Calif.

[21] Appl. No.: 450,210

[22] Filed: May 25, 1995

Related U.S. Application Data

[63] Continuation of Ser. No. 819,114, Jan. 10, 1992, Pat. No. 5,420,195.

[51] Int. Cl.$^6$ .................................................. C08L 33/08
[52] U.S. Cl. .......................... 524/556; 524/560; 524/561; 525/370; 525/371
[58] Field of Search ........................ 524/556, 560, 524/561; 525/370, 371

[56] References Cited

U.S. PATENT DOCUMENTS 5,420,195  5/1995  Mayer et al. .......................... 524/556

*Primary Examiner*—Edward J. Cain
*Attorney, Agent, or Firm*—Christie, Parker & Hale, LLP

[57] ABSTRACT

A water-resistant, removable pressure sensitive adhesive for use with transparent film facestocks comprises an acrylic-based emulsion polymer composition comprising 85 to 97% by weight alkyl acrylate monomers, up to 3% by weight polar monomers, up to 1% by weight internal crosslinking agent and up to 2% by weight external crosslinking agent.

15 Claims, No Drawings

WATER RESISTANT, REMOVABLE ACRYLIC EMULSION PRESSURE SENSITIVE ADHESIVE

CROSS-REFERENCE TO RELATED APPLICATION

This is a continuation of application Ser. No. 07/819,114 filed Jan. 10, 1992.

FIELD OF THE INVENTION

This invention relates to removable pressure-sensitive adhesives and more particularly to water resistant, removable acrylic emulsion pressure-sensitive adhesives for use with plasticized polyvinyl chloride and other film facestocks.

BACKGROUND OF THE INVENTION

Removable pressure-sensitive adhesives are used on a variety of products including labels, tapes, films, and the like, to enable the product to adhere to a substrate and then to later be removed from the substrate without difficulty and without leaving a stain or residue. Currently, commercially available acrylic emulsion removable pressure-sensitive adhesives cannot be used with film facestocks such as plasticized polyvinyl chloride (PVC) which are used in outdoor applications. Such outdoor applications include decorative decals which are applied to substrates such as glass. The typical technique for applying such a decorative decal to a substrate is to spray water on the adhesive and/or substrate so that the decal is slidingly movable over the substrate for ease of positioning. Unfortunately, in such a technique, the acrylic emulsion adhesive film turns milky in contact with water. For transparent filmstocks, this results in an undesirable appearance.

For a successful acrylic emulsion removable pressure-sensitive adhesive to be used with decorative films and decals in outdoor applications, the adhesive should exhibit good water resistance along with good anchorage of the adhesive to the film facestock to assure clean removability from the substrate. The only current commercially available acrylic emulsion pressure-sensitive adhesives which demonstrate good water resistance are permanent adhesives, i.e. those that leave an adhesive residue on the substrate if the facestock is removed. Currently available removable acrylic emulsion pressure-sensitive adhesives which demonstrate good anchorage to the film also exhibit poor water resistance. Accordingly, there is a need for a removable acrylic emulsion pressure-sensitive adhesive which combines both good water resistance and good anchorage to the film facestock.

SUMMARY OF THE INVENTION

The present invention provides a removable acrylic emulsion pressure-sensitive adhesive which demonstrates good water resistance and good anchorage to the facestock. The adhesives of the present invention are particularly adapted for use on plastic film facestocks, particularly PVC.

The pressure-sensitive adhesives comprise acrylic emulsion polymers including from about 85 to about 97% by weight alkyl acrylate monomers having from 1 to about 12 and preferably from about 4 to about 8 carbon atoms in the alkyl chain. Up to 15% by weight of the alkyl acrylate monomers can be replaced by vinyl acetate or other "hard" monomers, i.e., monomers having a glass transition temperature (Tg) of at least 5° C.

The polymers further comprise a positive amount of up to about 3% by weight of a polar monomer, preferably methacrylic and/or acrylic acid. The polymers further comprise an internal crosslinking agent, preferably, a multifunctional acrylate monomer or diallyl maleate, in an amount of up to about 1% by weight.

The polymers also comprise an external crosslinking agent, preferably a metal salt, more preferably a metal ammonium carbonate or acetate in an amount of up to about 2% by weight. Zirconium ammonium carbonate is presently preferred.

The polymers are preferably synthesized in the presence of a surfactant in an amount of no more than about 2% by weight.

The invention further comprises a method for preparing a water resistant removable acrylic emulsion pressure-sensitive adhesive. In the process, an aqueous pre-emulsion feed is prepared comprising the acrylic acrylate monomers, polar monomers, internal crosslinking agent and surfactant. The pre-emulsion feed is combined with a free radical generating feed preferably a redox emulsion polymerization catalyst. The preferred redox catalyst comprises a feed containing a peroxide or hydroperoxide initiator and a separate feed comprising a reductant e.g. ascorbic acid, for activating the initiator. After the polymerization reaction has reached completion and the reaction mixture cooled, the external crosslinker is added.

The resulting pressure-sensitive adhesive is then applied to film facestocks to provide a removable pressure-sensitive adhesive which demonstrates good water resistance.

DETAILED DESCRIPTION OF THE INVENTION

In accordance with the present invention, there is provided a water resistant, removable pressure-sensitive adhesive (PSA) composition comprising acrylic based emulsion polymers particularly useful with film facestocks such as transparent plasticized PVC, polyurethane, polyester, polyolefin. The removable PSA composition, when coated onto such a film facestock, exhibits low peel adhesion, preferably on the order of about 50 to about 300 N/m on stainless steel.

The acrylic based emulsion polymers comprise from about 85 to about 97% by weight acrylic acrylate monomers. Amounts of alkyl acrylate monomers below 85% are not presently preferred because the resultant glass transition temperature of the adhesive tends to be too high and the adhesive loses tack. Polymers having more than about 97% alkyl acrylate monomers are not preferred because the polymers tend to exhibit insufficient cohesive strength and leave stains or residue when peeled away from substrates. An amount of from about 90% to about 97% by weight alkyl acrylate monomers is presently preferred.

The alkyl acrylate monomers preferably have from 1 to about 12 carbon atoms in the alkyl chain and more preferably most of the alkyl acrylate monomers comprise from about 4 to about 8 carbon atoms in the alkyl chain. The lower alkyl acrylates, i.e. those having 1 to 3 carbon atoms in the alkyl chain, are not preferred as they tend to effect adhesion properties of the PSA composition, i.e., impart too low of an adhesion, on at least some substrates. Homopolymers of alkyl acrylates having more than 12 carbon atoms in the alkyl chain, tend to be crystalline and are not preferred. However, non-crystalline co-polymers including alkyl acrylates having more than 12 carbon atoms in the alkyl chain may be used as desired. Diesters of alpha, beta unsaturated dicarboxylic acids may also be beneficially used.

Polymers with at least the majority of the alkyl acrylate monomers having from about 4 to about 8 carbon atoms in the alkyl chain are presently preferred as providing the optimum balance of hardness, adhesion and removability. Exemplary preferred alkyl acrylates suitable for use in the present invention include 2-ethylhexyl acrylate, butyl acrylate, heptyl acrylate, octyl acrylate, isooctyl acrylate, and isobutyl acrylate. Butyl acrylate and 2-ethylhexyl acrylate are presently preferred.

Up to about 15% of the alkyl acrylate monomer may be replaced by a hard monomer. Preferred hard monomers include vinyl acetate, styrene, methyl methacrylate and vinyl pyrrolidone.

The polymer composition comprises up to about 3% of a polar monomer or blends of polar monomers to impart mechanical stability and cohesive strength to the polymer. The term "polar" monomer is meant to include organic acids, amides and alcohols. Examples of polar monomers include methacrylic acid, acrylic acid, itaconic acid, maleic acid, acrylamide, methacrylamide, 2-hydroxy ethyl acrylate and the like. Amounts of polar monomers greater than about 3% are not preferred because such amounts tends to impart too much adhesion to the adhesive which renders the product non-removable.

The polymer composition further comprises up to about 1% by weight of an internal cross-linking agent. The term "internal crosslinking agent" is meant to include polyfunctional compounds having at least two non-conjugated carbon-carbon double bonds per molecule which agent becomes part of the polymer during polymerization. It has been found that the amount of internal crosslinking agents should not exceed about 1%, as amounts greater than 1% tends to reduce stability of the acrylate-based emulsion from which the polymers are prepared. This results in coagulation of the emulsion particles during preparation. An amount of the internal crosslinking agent above about 0.3% are not preferred as no additional benefit is typically observed. Examples of suitable internal crosslinking agents include diallyl maleate, diallyl phthalate and multifunctional acrylates and methacrylates including polyethylene glycol diacrylate, hexanediol diacrylate, ethoxylated trimethylolpropane triacrylate, pentaerythritol triacrylate, propylene glycol diacrylate and trimethylolpropane trimethacrylate. Diallyl maleate is presently preferred.

An initiator is used to induce polymerization of the monomers. Any suitable initiator may be used. Preferred initiators include peroxides and hydroperoxides. The initiator is presently present in an amount of about 0.05 to about 0.3% by weight of the monomers. The presently preferred initiator is a redox system comprising an organic or inorganic peroxide as the oxidant and suitable reducing agent. Hydrogen peroxide is the preferred oxidant used in combination with ascorbic acid or sodium formaldehyde sulfonate as the reductant. Oxidant to reductant weight ratio is preferably about 0.5 to 3. Such combinations are preferred as they tend to provide optimum control of the rate of initiation and of the percentage conversion, i.e. the amount of polymer formed at any given time.

The polymer composition further comprises an external cross-linking agent which causes post polymerization crosslinking in an amount up to about 2% by weight, and preferably from about 0.1 to about 0.7% by weight. External cross-linking agents include metal salts such as zirconium ammonium carbonate, zinc ammonium carbonate, aluminum acetate, zinc acetate and chromium acetate. The presently preferred external crosslinking agent is zirconium ammonium carbonate. Amounts of external crosslinking agent greater than about 2% are not presently preferred because of undesirable loss of adhesion.

The monomers are preferably polymerized in the presence of a surfactant or a mixture of surfactants. The total amount of surfactant is preferably below about 2% by weight of the polymers. Preferred surfactants include Disponil FES 77, a sodium alkyl ether sulfate surfactant marketed by Henkel, Aerosol OT 75, a sodium dioctyl sulfosuccinate, a surfactant marketed by American Cyanamide, and Triton X-100 an octylphenoxypolyethoxyethanol marketed by Rohm and Haas and surfactants which are copolymerizable such as a sodium salt of styrene sulfonate, sodium vinyl sulfonate manufactured by E. Hoechst, sodium alkylether sulfonate manufactured by Alcolace, sodium 2-methacryloyloxyethyl sulfonate manufactured by Dow and the like. A sodium salt of styrene sulfonate is the preferred copolymerizable surfactant.

A method for preparing acrylic-based emulsion polymers of the present invention comprises first preparing a free radical generating feed preferably a redox emulsion polymerization catalyst comprising an oxidizer feed and a reductant feed and a pre-emulsion feed. The oxidizer feed comprises water and oxidant, e.g. hydrogen peroxide or tertiary butylhydroperoxide. The reductant feed comprises water and a reductant such as ascorbic acid or sodium formaldehyde sulfoxylate. The pre-emulsion feed comprises the alkyl acrylate monomers, polar monomers, internal crosslinking agents, surfactants and water. The initiator and pre-emulsion feeds can be combined if desired.

In the preferred method, the initiator, catalyst and pre-emulsion feeds are added simultaneously to a suitable reactor and polymerization occurs.

After the polymerization reaction mixture has cooled, e.g. to 30° to 50° C. an aqueous solution containing the external crosslinking agent is added to the composition It is preferred that a 20% aqueous solution of the crosslinking agent be used.

The removable pressure sensitive adhesives of the present invention provide certain unique advantages. For example, because of their water resistance, they are particularly useful with clear plastic film facestocks where either the adhesive or the substrate is wetted with water before application. In such applications, it is not important if there is an increase in peel adhesion over time and/or temperature—only that the adhesive be cleanly removable. In fact, an increase in peel adhesion alone with clean removability is generally desireable. Further, the adhesives are based on water-based emulsion technology rather than more toxic solvent-based technology.

Examples 1–3

Examples 1–3, shown in Table 1 below, are commercially available pressure sensitive products. Example 1 is a commercially available removable pressure sensitive adhesive marketed by Avery Dennison Corp. marketed under the trade designation AE2605. This pressure sensitive adhesive was prepared according to Example 1 in U.S. Pat. No. 4,975,908, which is incorporated herein by reference. Example 2 is the same as Example 1 except that 0.5% of zirconium ammonium carbonate was added as an external crosslinker after initial polymerization was completed. Example 3 is a commercially removable pressure sensitive adhesive marketed by Avery Dennison Corporation under the trade designation UVR-150.

Example 4

To a four liter, four necked jacketed reactor equipped with thermocouple, reflux condenser, stainless steel blade stirrer and nitrogen inlet tube, were charged 468.75 grams of deionized water, 0.125 g of NaFeEDTA, 1.0 g ascorbic acid, and 0.6 g of Disponil FES 77, a surfactant sold by Henkel. A monomer mix consisting of 1245 g of butyl acrylate, 232.5 g of 2-ethylhexyl acrylate, 30.75 g of methacrylic acid, and 33.5 g of acrylic acid was added to 190 g of water containing 40 g of Disponil FES 77, 1.03 g of sodium bicarbonate, and 5.8 g of Aerosol OT 75, a surfactant sold by American Cyanamid and was agitated for sufficient time until the formation of a stable pre-emulsion feed. An initiator feed containing 4.35 g hydrogen peroxide in 130 g water was prepared. A reductant feed containing 2.5 g ascorbic acid in 130 g water was prepared. The contents of the flask were agitated while purging nitrogen for 15–20 minutes and then heated to 45° C. At 45° C. a solution of the initiator containing 1.7 g hydrogen peroxide in 43.2 g water was added. Then the pre-emulsion feed, and the initiator feed, and the catalyst feed were started simultaneously. The pre-emulsion feed started at a rate of 6.87 g/min for 30 minutes, then increased the rate to 8.86 g/min for a overall 3.5 hour feed period. The initiator and catalyst feeds maintained a 0.56 g/min rate over a 4 hour period. After all the feeds had been added, the mixture was tested for the presence of free monomer. Based on the test results, a second initiator solution was prepared by adding 0.23 g tert-butyl hydroperoxide (80%), 0.063 ascorbic acid, 0.015 g Disponil FES 77 to 5.94 g water and added to the reaction mixture. After 30 minutes another second initiator solution was added. After 1 hour, the composition was cooled and neutralized with ammonia, then filtered through a 300 mesh nylon sieve. The resulting composition had a solids content of 58%, a percent coagulum of less than 0.01%, and a viscosity of about 250 centipoise as measured by a Brookfield viscometer, and a pH of 6.6.

Example 5

Example No. 4 was repeated with the exception that the pre-emulsion mix contained 1345.25 g butyl acrylate, 155 g vinyl acetate, 15.5 g methacrylic acid, 15.5 acrylic acid, 0.8 g diallyl maleate, and 8 g sodium p-styrenesulfonate (a copolymerizable surfactant sold by Toyo Soda Manufacturing Co.).

Example 6

Example No. 5 was repeated except that 0.7% by weight based on the weight of the polymers of zirconium ammonium carbonate (sold by Magnesium Elektron) external crosslinker was added to the polymer composition after initial polymerization was completed and the polymer composition had cooled to about 30° C.

Example 7

Example No. 4 was repeated with the exception that the pre-emulsion mix contained 1260.38 g butyl acrylate, 232.5 g 2-ethylhexyl acrylate, 23.13 g methacrylic acid, 23.13 g acrylic acid, and 0.52 g diallyl maleate. Further, 0.5% by weight zirconium ammonium carbonate was added to the polymer composition after initial polymerization was completed and the polymer composition had cooled to about 30° C.

Example 8

Example No. 7 was repeated with the exception that the pre-emulsion mix contained 15.5 g methacrylic acid, 15.5 g acrylic acid, and 15.45 g sodium p-styrenesulfonate. 0.7 % by weight zirconium ammonium carbonate was used.

Example 9

Example No. 8 was repeated with the exception that the pre-emulsion mix contained 7.72 g sodium p-styrenesulfonate.

Example 10

Example No. 8 was repeated with the exception that the pre-emulsion mix contained 5.1 g sodium p-styrenesulfonate. 0.5% by weight zirconium ammonium carbonate was used.

Example 11

Example No. 10 was repeated with the exception that the pre-emulsion mix contained 0.54 g 1,6-hexanediol diacrylate instead of diallyl maleate.

Example 12

Example No. 10 was repeated with the exception that the pre-emulsion mix contained no diallyl maleate.

Example 13

Example No. 10 was repeated with the exception that 1.4 g tert. butylhydroperoxide were used in the initiator feed, and 1.45 g ascorbic acid were used in the catalyst feed.

The pressure sensitive adhesives of Examples 1–13 above were coated onto label quality monomerically plasticized polyvinyl chloride facestock having a thickness of 100 microns. The resultant pressure sensitive adhesive films were tested for shear adhesion, loop tack on glass and HDPE, peel adhesion, percent shrinkage, removability and water resistance. The coating weights and test results are shown in Table 1 below.

The shear adhesion test was performed according to PSTC No. 7, except that the test area was 0.5 inch by 0.5 inch and the load was 500 g.

The loop tack/glass test was performed according to Finat FTM 9. The loop tack/HDPE test was performed according to Finat FTM 9 except that high density polyethylene (HDPE) panels were used rather than glass.

The 90° peel/SS/20 M (minute) and 90° peel/SS/24 H (hour) tests were performed according to Finat FTM 2 but on stainless steel rather than glass.

In the shrinkage test, a 10×10 cm sample of the pressure sensitive adhesive film construction was applied to a glass plate and a cross was cut in the middle in both directions. After a 20 minute dwell at room temperature, the test plate with the sample was aged at 70° C. for 72 hours. The plate was then cooled to room temperature and the distance between the two halves of the tested film were measured and expressed as a percentage of the original dimension, both in machine and cross direction.

In the transfer or removability test, a 25 mm test strip of the pressure sensitive adhesive film was applied to a glass plate maintained at room temperature for 20 minutes and then stored at 70° C. for one week. The plate was then cooled to room temperature and the test strip manually removed. The plate was visually observed for stain or residue.

The water resistance test was performed by placing a drop of water onto the dried adhesive film in a work area protected from draft. The area of the adhesive underneath the water drop is observed for development of haze or other discoloration for a period of 24 hours. The adhesives are ranked between "3+" or "+++" and "3–" or "———" wherein the designations mean:

3+= film remains clear for more than 30 min.

2+= film remains clear (or develops a very slight bluish haze) for at least 30 min.

1+= film remains clear (or develops a very slight bluish haze) for at least 5 min.

0= film develops a slight bluish haze in less than 5 min.

1–= film develops a milky-white haze in 2–5 min.

2–= film develops a milky-white haze in less than 2 min.

3–= film turns completely white in less than 30 sec.

TABLE 1

| | COAT EIGHT g/m2] | SHEAR 500 G 12.5 × 12.5 mm [H] | LOOP TEST GLASS [N/25 mm] | LOOP TEST HDPE [N/25 mm] | 90° PEEL ADHESIVE(SS) 20 M [N/25 MM] | 90° PEEL ADHESIVE(SS) 24 H |
|---|---|---|---|---|---|---|
| Controls | | | | | | |
| 1 | 17.5 | 0.53 | 3.8 | 2.1 | 3.3 | 3.3 |
| 2 | 19.4 | 2.09 | 5.2 | 2.2 | 3.5 | 4.0 |
| 3 | 17.5 | 0.59 | 7.1 | 2.9 | 4.0 | 5.6 |
| 4 | 21.1 | 0.48 | 17.9 | 3.0 | 7.8 | 9.7 |
| Examples | | | | | | |
| 5 | 20.8 | 3.43 | 11.9 | 2.1 | 5.7 | 6.3 |
| 6 | 20.9 | 97.88 | 6.9 | 1.8 | 4.1 | 4.9 |
| 7 | 21.9 | 8.00 | 11.2 | 2.1 | 5.0 | 8.1 |
| 8 | 20.6 | 27.76 | 10.2 | 1.5 | 4.1 | 5.7 |
| 9 | 19.8 | 31.20 | 9.1 | 2.4 | 4.2 | 6.0 |
| 10 | 18.7 | 18.14 | 8.9 | 2.5 | 4.1 | 5.2 |
| 11 | 16.3 | 20.20 | 7.7 | 1.6 | 3.9 | 4.8 |
| 12 | 16.0 | 27.90 | 9.4 | 1.8 | 4.2 | 5.5 |
| 13 | 17.5 | 36.27 | 7.5 | 1.7 | 3.3 | 5.0 |

| | % SHRINKAGE 72 H @ 70° C. | | TRANSFER TEST | WATER |
|---|---|---|---|---|
| | md | cd | 7D @ 70° C. | RESISTANCE |
| Controls | | | | |
| 1 | 0.2 | 0.2 | CL | – – |
| 2 | 0.2 | 0.2 | CL | – – |
| 3 | 0.2 | 0.2 | CL | – – |
| 4 | 1.1 | 0.7 | FAT | + |
| Examples | | | | |
| 5 | 0.3 | 0.3 | CL | + |
| 6 | 0.3 | 0.2 | CL | + + |
| 7 | 0.3 | 0.2 | PAT | + + + |
| 8 | 0.2 | 0.1 | CL | + + |
| 9 | 0.3 | 0.2 | CL | + + |
| 10 | 0.2 | 0.2 | CL | + + |
| 11 | 0.2 | 0.2 | CL | + + |
| 12 | 0.3 | 0.2 | CL | + + |
| 13 | 0.3 | 0.2 | CL | + + |

CD = CROSS DIRECTION
MD = MACHINE DIRECTION
FAT = FULL ADHESIVE TRANSFER
PAT = PARTIAL ADHESIVE TRANSFER
CL = CLEAN PANEL (NO ADHESIVE TRANSFER)
HDPE = BLACK HOPE PANELS
SS = STAINLESS STEEL

What is claimed is:

1. A water-resistant acrylic emulsion pressure-sensitive adhesive polymer comprising:

a. from about 85% to about 97% by weight alkyl acrylate monomers;

b. a positive amount up to about 3% by weight of polar monomers;

c. a positive amount up to about 1% by weight of an internal cross-linking agent; and d. a positive amount up to about 2% by weight of an external cross-linking agent.

2. A pressure-sensitive adhesive as claimed in claim 1 further comprising up to about 2% by weight surfactant.

3. A pressure-sensitive adhesive as claimed in claim 1 wherein the alkylacrylate is selected from the group consisting of 2-ethylhexyl acrylate, butyl acrylate, heptyl acrylate, octyl acrylate, isooctyl acrylate, and isobutyl acrylate.

4. A pressure-sensitive adhesive as claimed in claim 1 wherein the internal crosslinking agent is selected from the group consisting of polyethylene glycol diacrylate, hexanediol diacrylate, ethoxylated trimethylolpropane triacrylate, pentaeythritol triacrylate, propyleneglycol diacrylate, diallyl maleate, diallyl phthalate and trimethylolpropane trimethacrylate.

5. A pressure-sensitive adhesive as claimed in claim 1 wherein the external cross-linking agent is selected from the group consisting of zirconium ammonium carbonate, zinc ammonium carbonate, aluminum acetate and zinc acetate.

6. A pressure-sensitive adhesive as claimed in claim 1 wherein up to about 15% of the alkylacrylate is replaced by a hard monomer.

7. A pressure-sensitive adhesive as claimed in claim 6 wherein the hard monomer is selected from the group consisting of vinyl acetate, styrene, methyl methacrylate and vinyl pyrrolidone.

8. A water resistant, removable pressure sensitive adhesive construction comprising:
   a film facestock having opposed surfaces;
   a removable pressure-sensitive adhesive polymer applied to one of the opposed surfaces of the film facestock, said pressure-sensitive adhesive polymer comprising:
   from about 85% to about 97% by weight alkylacrylate monomers;
   a positive amount of up to about 3% by weight of polar monomers;
   a positive amount of up to about 1% by weight of an internal crosslinking agent; and
   a positive amount of up to about 2% by weight of an external cross-linking agent.

9. A removable pressure-sensitive adhesive construction as claimed in claim 8 wherein up to about 15% of the alkyl acrylate monomers are replaced by hard monomers.

10. A removable pressure-sensitive adhesive construction as claimed in claim 1 in which the adhesive is formed by emulsion polymerization in the presence of a redox emulsion polymerization catalyst.

11. A removable pressure-sensitive adhesive construction as claimed in claim 10 in which the redox emulsion polymerization catalyst comprises a peroxide oxidant and a reductant selected from the group consisting of ascorbic acid and sodium formaldehyde sulfoxylate.

12. A removable pressure-sensitive adhesive construction as claimed in claim 11 in which the peroxide is selected from the group consisting of hydrogen peroxide and hydroperoxides.

13. A removable pressure-sensitive adhesive construction as claimed in claim 8 in which the adhesive is formed by emulsion polymerization in the presence of a redox emulsion polymerization catalyst.

14. A removable pressure-sensitive adhesive construction as claimed in claim 13 in which the redox emulsion polymerization catalyst comprises a peroxide oxidant and a reductant selected from the group consisting of ascorbic acid and sodium formaldehyde sulfoxylate.

15. A removable pressure-sensitive adhesive construction as claimed in claim 14 in which the peroxide is selected from the group consisting of hydrogen peroxide and hydroperoxides.

* * * * *